(12) United States Patent
Wittmann et al.

(10) Patent No.: US 11,413,834 B2
(45) Date of Patent: Aug. 16, 2022

(54) PRODUCTION OF OPTICAL COMPONENTS

(71) Applicant: OSRAM Opto Semiconductors GmbH, Regensburg (DE)

(72) Inventors: Marco Wittmann, Abensberg (DE); Markus Boss, Regensburg (DE)

(73) Assignee: OSRAM OLED GmbH, Regensburg (DE)

( * ) Notice: Subject to any disclaimer, the term of this patent is extended or adjusted under 35 U.S.C. 154(b) by 291 days.

(21) Appl. No.: 16/318,879

(22) PCT Filed: Jul. 18, 2017

(86) PCT No.: PCT/EP2017/068159
§ 371 (c)(1),
(2) Date: Jan. 18, 2019

(87) PCT Pub. No.: WO2018/015400
PCT Pub. Date: Jan. 25, 2018

(65) Prior Publication Data
US 2019/0184655 A1     Jun. 20, 2019

(30) Foreign Application Priority Data

Jul. 21, 2016   (DE) .................... 10 2016 113 471.6

(51) Int. Cl.
*B29D 11/00*        (2006.01)
(52) U.S. Cl.
CPC .... *B29D 11/00375* (2013.01); *B29D 11/0048* (2013.01); *B29D 11/00269* (2013.01); *B29D 11/00413* (2013.01)

(58) Field of Classification Search
CPC ........ B29D 11/00375; B29D 11/00413; B29D 11/00269; B29D 11/0048
See application file for complete search history.

(56) References Cited

U.S. PATENT DOCUMENTS 4,154,506 A      5/1979   Yevick
6,814,901 B2 *  11/2004  Itoh .................. B29D 11/00375
                                                                156/99

(Continued)

FOREIGN PATENT DOCUMENTS

CN              101945754 A       1/2011
DE       10 2004 038 727 A1       2/2006

(Continued)

OTHER PUBLICATIONS

First Office Action dated May 28, 2020, of counterpart Chinese Application No. 201780045243.9, along with an English translation.

(Continued)

*Primary Examiner* — Mathieu D Vargot
(74) *Attorney, Agent, or Firm* — DLA Piper LLP (US)

(57) ABSTRACT

A method of producing optical components includes providing an initial carrier including cutouts; carrying out a molding process to form transparent optical molded parts arranged in the cutouts of the initial carrier, wherein a molding compound is introduced into the cutouts of the initial carrier and the molding compound is molded and cured; and singulating the initial carrier including the optical molded parts so that separate optical components are formed that respectively include a carrier produced from the initial carrier and including a cutout, and an optical molded part arranged in the cutout.

14 Claims, 7 Drawing Sheets

(56) References Cited

U.S. PATENT DOCUMENTS

| | | |
|---|---|---|
| 2005/0035474 A1 | 2/2005 | Itoh |
| 2009/0219632 A1 | 9/2009 | Kang et al. |
| 2011/0024030 A1 | 2/2011 | Rudmann et al. |
| 2011/0043923 A1 | 2/2011 | Rossi et al. |
| 2013/0003199 A1 | 1/2013 | Jeong et al. |
| 2013/0037975 A1 | 2/2013 | Thallner et al. |
| 2014/0220713 A1 | 8/2014 | Dowski, Jr. et al. |

FOREIGN PATENT DOCUMENTS

| | | | |
|---|---|---|---|
| DE | 10 2007 004 579 A1 | | 8/2007 |
| JP | 9-90360 | * | 4/1997 |
| JP | 11-23805 A | | 1/1999 |
| JP | 2004-341474 A | | 12/2003 |
| JP | 2009-279790 A | | 12/2009 |
| JP | 2009-300596 A | | 12/2009 |
| JP | 2010-204642 A | | 9/2010 |
| JP | 2013-525828 A | | 6/2013 |
| WO | 2016/021577 A1 | | 2/2016 |

OTHER PUBLICATIONS

Notice of Reasons for Rejection dated Dec. 24, 2019, of counterpart Japanese Application No. 2019-500590, along with an English Translation.

Search Report dated Dec. 26, 2019, of counterpart Japanese Application No. 2019-500590, along with an English Translation.

Second Office Action dated Feb. 1, 2021, of counterpart Chinese Application No. 201780045243.9, along with an English translation.

\* cited by examiner

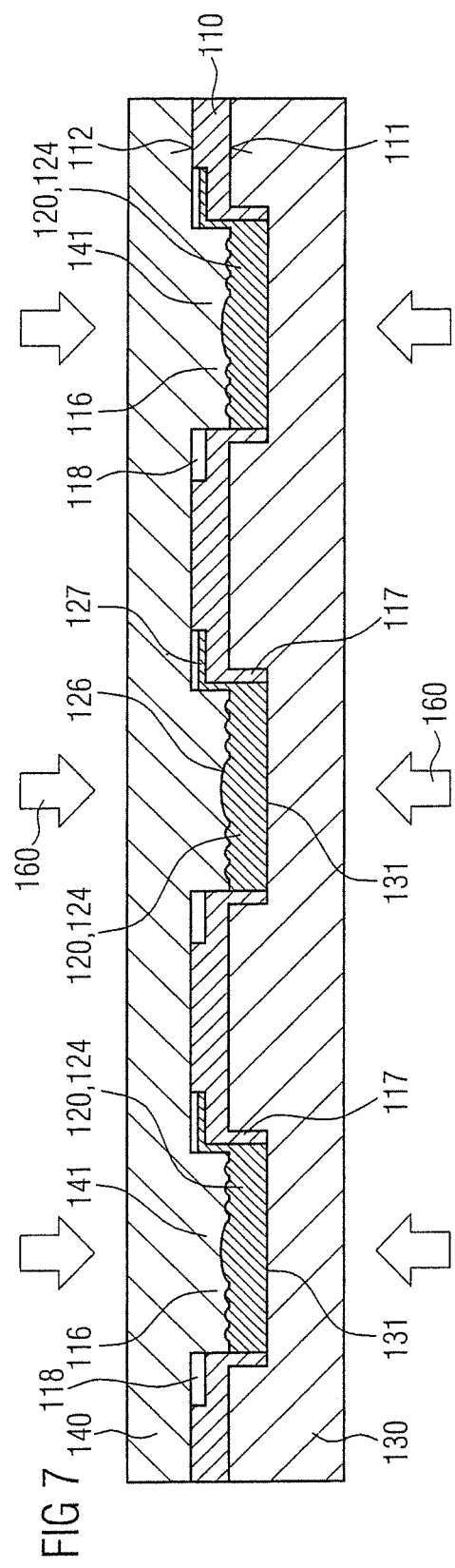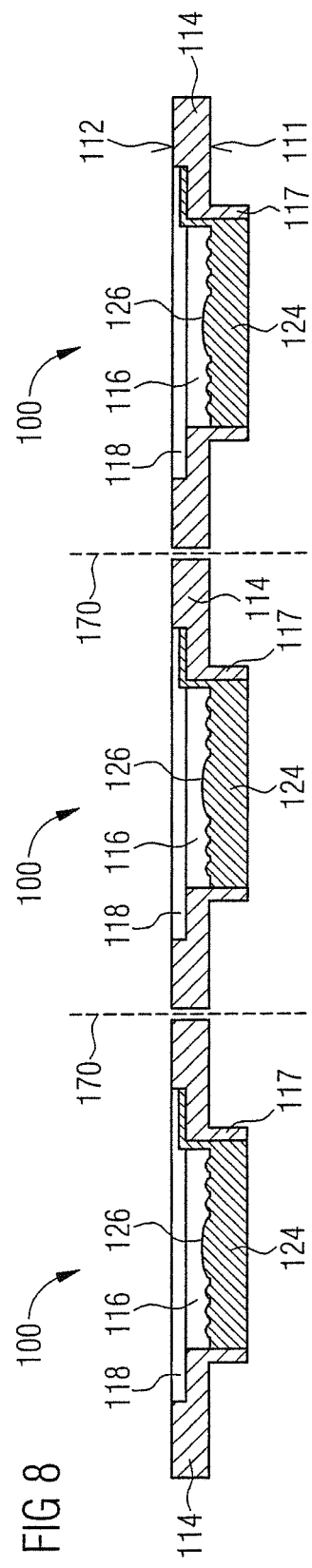

PRODUCTION OF OPTICAL COMPONENTS

TECHNICAL FIELD

This disclosure relates to a method of producing optical components.

BACKGROUND

Semiconductor light sources are increasingly being used for illumination applications. One example involves flash lights of mobile devices, for example, smartphones that generally comprise a light-emitting diode (LED) that produces white light radiation. Conventionally, a subsequent optical element in the form of a lens is additionally used to induce beam shaping of the emitted light radiation.

In one currently used method, a multiplicity of such lenses are produced in an assemblage. Production of the lenses is carried out at the wafer level. The method is therefore also referred to as a WLO (wafer-level optics) process. The lenses produced as an assemblage comprise a transparent plastic material and therefore optically transmissive side walls.

There is nonetheless a need to provide an improved method of producing optical components.

SUMMARY

We provide a method of producing optical components including providing an initial carrier including cutouts; carrying out a molding process to form transparent optical molded parts arranged in the cutouts of the initial carrier, wherein a molding compound is introduced into the cutouts of the initial carrier and the molding compound is molded and cured; and singulating the initial carrier including the optical molded parts so that separate optical components are formed that respectively include a carrier produced from the initial carrier and including a cutout, and an optical molded part arranged in the cutout.

We also provide a method of producing optical components including providing an initial carrier including cutouts; carrying out a molding process to form transparent optical molded parts arranged in the cutouts of the initial carrier, wherein a molding compound is introduced into the cutouts of the initial carrier and the molding compound is molded and cured; and singulating the initial carrier including the optical molded parts so that separate optical components are formed that respectively include a carrier produced from the initial carrier and including a cutout, and an optical molded part arranged in the cutout, wherein the initial carrier includes protruding collar sections enclosing the cutouts, and the optical molded parts are formed in a region of the collar sections so that the optical molded parts are laterally enclosed by the collar sections.

We further provide a method of producing optical components including providing an initial carrier including cutouts; carrying out a molding process to form transparent optical molded parts arranged in the cutouts of the initial carrier, wherein a molding compound is introduced into the cutouts of the initial carrier and the molding compound is molded and cured; and singulating the initial carrier including the optical molded parts so that separate optical components are formed that respectively include a carrier produced from the initial carrier and including a cutout, and an optical molded part arranged in the cutout, wherein the initial carrier includes indentations in which the cutouts are formed, the initial carrier includes protruding collar sections enclosing the cutouts, and the indentations and the collar sections are formed at opposite sides of the initial carrier.

BRIEF DESCRIPTION OF THE DRAWINGS

FIGS. 5 to 8 show a method sequence for the production of optical components with the aid of lateral sectional representations, a UV molding process being carried out in which optical molded parts comprising a Fresnel lens structure and arranged in the cutouts of the initial carrier are formed, and the initial carrier provided with the optical molded parts subsequently being singulated.

LIST OF REFERENCES

Figure 1:
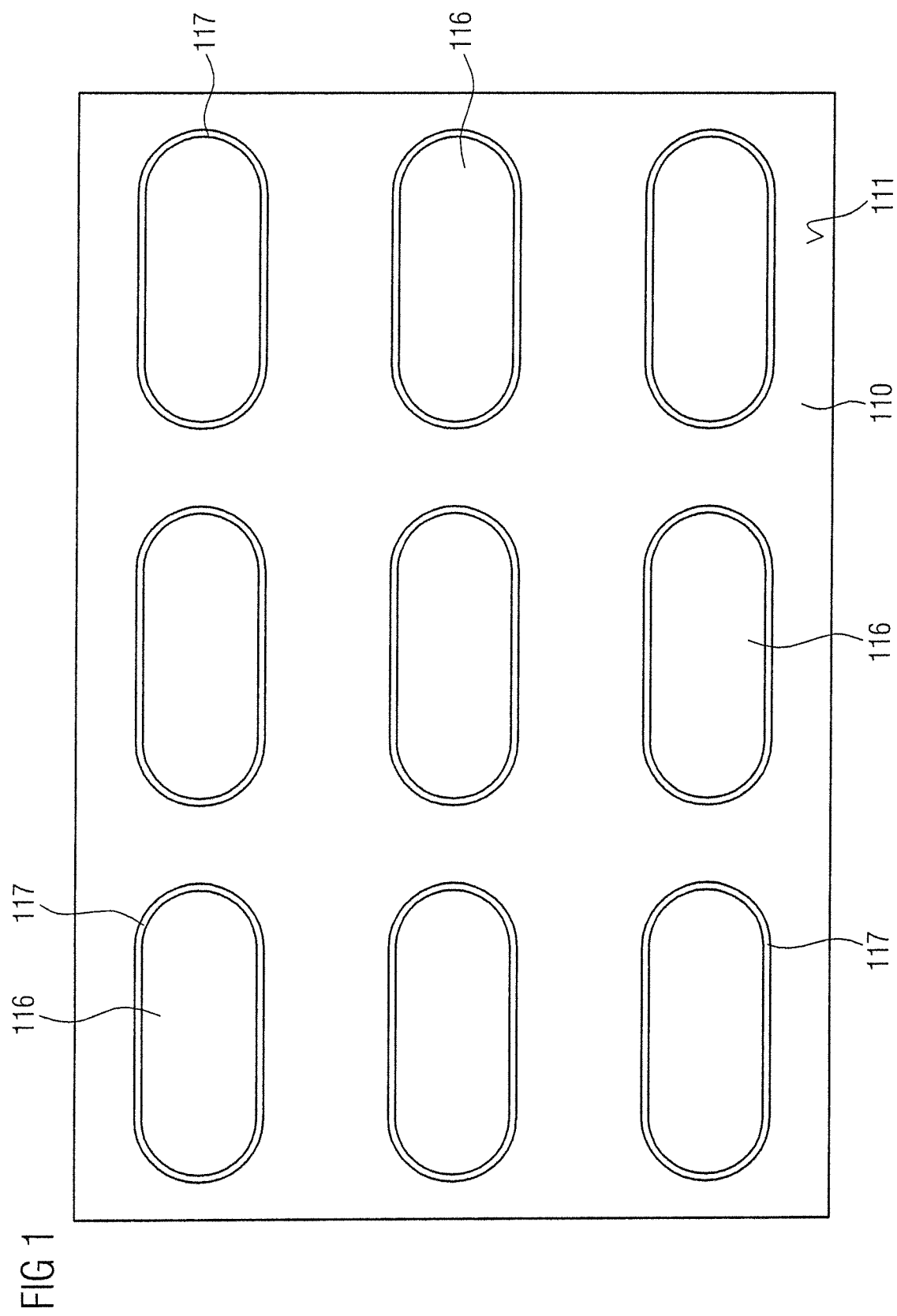
FIGS. 1 and 2 show plan view representations of an initial carrier comprising cutouts.

100 optical component
110 initial carrier
111 side
112 side
114 carrier
116 cutout
117 collar section
118 indentation
120 molding compound
124 molded part
126 Fresnel lens structure
127 section
128 Fresnel lens structure
130 tool part
131 recess
132 recess
140 tool part
141 molding section
142 molding section
160 UV radiation
170 separating line

DETAILED DESCRIPTION

Our method of producing optical components provides an initial carrier comprising cutouts. A further step is carrying out a molding process to form transparent optical molded parts arranged in the cutouts of the initial carrier. During the molding process, a molding compound is introduced into the cutouts of the initial carrier and the molding compound is molded and cured. The method furthermore comprises singulating the initial carrier comprising the optical molded parts so that separate optical components are formed. The optical components respectively comprise a carrier produced from the initial carrier and comprising a cutout, and an optical molded part arranged in the cutout.

A multiplicity of optical components are produced together. The optical components respectively comprise a transparent optical molded part and a carrier surrounding the optical molded part. The carrier may comprise a frame-like configuration. The initial carrier and, therefore, also the carriers of the optical components that may constitute the side walls of the associated optical molded parts may be formed from a different material than the optical molded parts. Compared to an alternative possible procedure of inserting optical elements individually into separate frame parts, the method can be carried out with a low outlay. As a result, our method may be used for economical production of optical components in high batch numbers.

Further details and examples, which may be envisaged for the production method, will be described in more detail below.

The molding process may be carried out with the aid of a tool (molding tool) comprising a plurality of, or two tool parts. The initial carrier may be arranged on one tool part. A further tool part used to carry out the molding process may comprise protruding molding sections. The molding sections may comprise a contour corresponding to the cutouts of the initial carrier. After the molding compound has been introduced into the cutouts of the initial carrier, the tool parts may be brought together. In this way, the molding sections that mold the molding compound can be inserted into the cutouts of the initial carrier, and the desired shape of the optical molded parts can consequently be provided.

By subsequent curing of the molding compound, this shape can be fixed. Later, the tool may be opened so that the initial carrier provided with the optical molded parts can be removed from the tool and singulated into the optical components.

The transparent optical molded parts constituted from the molding compound by the molding process may comprise a beam-shaping surface, or surface structure, at one side. It is also possible to produce optical molded parts comprising such an optically active surface at two opposite sides. Such configurations may be implemented as follows.

The molding sections described above, which are intended for insertion into the cutouts of the initial carrier, may comprise a surface shape to produce a beam-shaping optical surface at one end.

It is also possible that the tool part on which the initial carrier may be arranged before the molding process comprises a surface shape to produce a beam-shaping optical surface in the region of the respective molded parts to be produced. In this example, the further tool part may comprise protruding molding sections formed to be planar at the end. It is also possible that the molding sections at the end comprise a surface shape to produce a (further) beam-shaping surface.

The initial carrier, which may be used as a basis or base shape for the molding compound, may be formed in the form of a plate. The cutouts of the initial carrier that may pass fully through the initial carrier or may be through-openings, may be arranged in a regular grid.

The initial carrier provided may comprise indentations in which the cutouts are respectively formed. During the molding process, with the aid of the indentations, reception or overflow regions may be constituted in which, besides air, excess portions of the molding compound may be received. In this way, it is possible to compensate for dosing inaccuracies possibly occurring when introducing the molding compound into the cutouts of the initial carrier. Furthermore, the transparent optical molded parts may comprise sections produced from the excess molding compound and extend to the indentations, and are present in the indentations. In this way, anchoring the molded parts can be achieved so that the molded parts can be reliably fastened on the respectively associated carriers in the optical components produced.

The initial carrier may comprise protruding collar sections respectively enclosing the cutouts. In this example, a part, or a large part, of the cutouts of the initial carrier may each be constituted with the aid of the collar sections. During the molding process, the transparent optical molded parts may be formed in the region of the collar sections. In this way, the collar sections may be used as side walls of the optical components produced, by which collar sections the optical molded parts may be laterally enclosed. With the aid of the collar sections, it is furthermore possible to orient the initial carrier with a view to the molding process and establish its position on a tool part.

In one possible configuration of the initial carrier comprising the above-explained indentations together with the collar sections, the indentations and the collar sections may be formed at opposite sides of the initial carrier. In a corresponding way, the carriers, produced from the initial carrier by the singulating, of the optical components may respectively comprise an indentation and a collar section at opposite sides. The opposite sides may be a front side and a rear side. The indentations may be located at the rear side, and the collar sections may be located at the front side of the carrier, and therefore of the optical components.

In relation to the aforementioned orientation of the initial carrier by using the collar sections, the following example may furthermore be employed. In this example, the initial carrier is arranged on a tool part used to carry out the molding process, which comprises recesses that receive the collar sections and therefore the molding compound. With the aid of this example, the position of the initial carrier on the tool part can be established reliably.

The aforementioned recesses of the tool part may comprise a planar bottom. A configuration in which the recesses comprise a surface shape to produce a beam-shaping optical surface at the bottom is also possible.

The molding compound used to form the transparent optical molded parts is a transparent molding compound. The molding compound may be a transparent plastic material or resin material, for example, a transparent silicone material. It is also possible to use a transparent epoxide material as the molding compound. The molding compound may be introduced into the cutouts of the initial carrier in a liquid or viscous state, and may also be molded in this state. Introduction of the molding compound into the cutouts of the initial carrier may, for example, be carried out with the aid of a dosing process by using a dispenser (dispensing). Dropwise introduction with the aid of a printing device (jetting) is also possible.

By curing the molding compound, carried out after introduction and molding of the molding compound, the shape of the optical molded parts can be fixed. In this context, the following examples may be used.

The transparent molding compound may be a UV-curing molding compound, i.e., a molding compound that can be solidified with the aid of UV radiation (ultraviolet radiation). This may be a transparent UV-curing silicone material or a transparent UV-curing epoxide material. In this configuration, irradiation with UV radiation is carried out to cure the molding compound. The molding process carried out by using such UV exposure, which may also be referred to as a UV mold process or UV molding, makes it possible to form the optical molded parts in a simple and reliable way.

The molding process may be carried out with the aid of tool parts of a tool, at least one tool part being transmissive for UV radiation. In this way, the molding compound may be exposed to UV radiation for the curing. So that this is possible with high reliability, a plurality of, or two, tool parts used for the molding process may also be transmissive to UV radiation. The relevant tool part or parts may to this end be formed from a plastic material transmissive to UV radiation.

The transparent optical molded parts formed by the molding process may be lenses. The lenses may, for example, comprise a concavely or convexly curved optical surface. It is also possible for the lenses to comprise a Fresnel lens structure. Furthermore, optical molded parts comprising a different beam-shaping optical surface, or structure, may also be formed by the molding process. One example is a surface comprising a regular arrangement of structural elements, for example, microlenses, micropyramids or microcones. As indicated above, the optical molded parts may be formed by the molding process such that the molded parts comprise such or alternatively other optically active surfaces at one or at two opposite sides.

The initial carrier may be formed from an opaque material. This therefore applies in the same way to the carriers, produced from the initial carrier, of the optical components. In this configuration, the carriers may constitute opaque side walls of the optical components. In one possible application of such an optical component for a light source, for example, an LED light source, lateral radiation emission can be suppressed in this way. The initial carrier may, for example, be formed from an opaque plastic material. A configuration made of a metallic or opaque ceramic material is also possible.

The optical components produced with the aid of the method may be used as primary optics of light-emitting components for beam shaping. For example, use in LED-based flash lights of mobile devices, for example, smartphones is possible. Further application examples are LED components for background lighting (backlight) and other light-emitting components or packages in which the use of a fitted optical component for beam shaping is intended.

The advantages, examples and refinements explained above except, for example, in unique dependencies or incompatible alternatives may be used individually or in any desired combination with one another.

The above-described properties, features and advantages as well as the way in which they are achieved will become more clearly and readily comprehensible in conjunction with the following description of examples, which will be explained in more detail in connection with the schematic drawings.

With the aid of the following schematic figures, configurations of a method of producing optical components 100 will be described. The optical components 100 comprise a transparent optical molded part 124 comprising at least one lens structure 126, 128, and a frame-shaped carrier 114 enclosing the optical molded part 124. In the method, a multiplicity of optical components 100 are made in a common parallel fashion. In this way, the optical components 100 can be produced with a low outlay. The method may be carried out at the wafer level and therefore be also referred to as a WLO (wafer-level optics) method.

The figures are merely schematic in nature and are not true to scale. In this sense, component parts and structures shown in the figures may be represented exaggeratedly large or reduced for better understanding.

Figure 2:
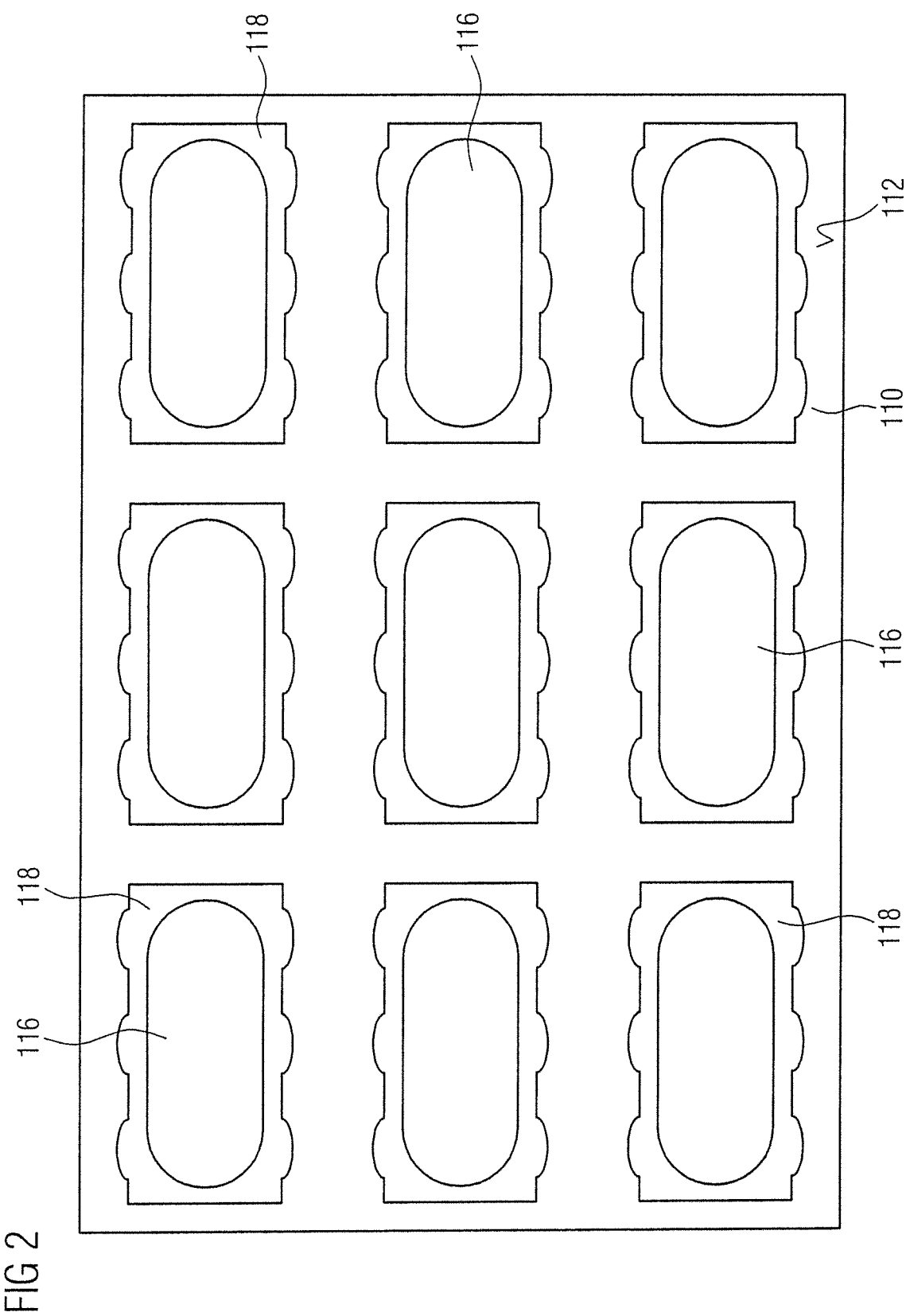

At the start of the method, a plate-shaped initial carrier 110 comprising a multiplicity of cutouts 116 is provided, this being shown in FIGS. 1 and 2 in different plan view representations. FIG. 1 shows a first side 111 and FIG. 2 shows a second side 112, opposite the former, of the initial carrier 110. The cutouts 116, which pass fully through the initial carrier 110 and may also be referred to as cavities, are arranged in a regular grid of rows and columns.

FIGS. 1 and 2 illustrate one possible configuration of the initial carrier 110 comprising nine cutouts 116 arranged in three rows and three columns. The initial carrier 110 provided may alternatively comprise a different or larger number of cutouts 116. This applies correspondingly for the collar sections 117 and indentations 118 explained below and present in the region of the cutouts 116 of the initial carrier 110. In this sense, FIGS. 1 and 2, as well as FIGS. 5 to 10 explained below, may be understood as excerpt illustrations of the initial carrier 110 and the situations respectively depicted.

According to the configuration represented in FIGS. 1 and 2, the cutouts 116 of the initial carrier 110 comprise a rounded rectangular plan view shape. In contrast thereto, the cutouts 116 of the initial carrier 110 may also comprise a different contour, for example, a circular contour or a purely rectangular contour.

Figure 3:
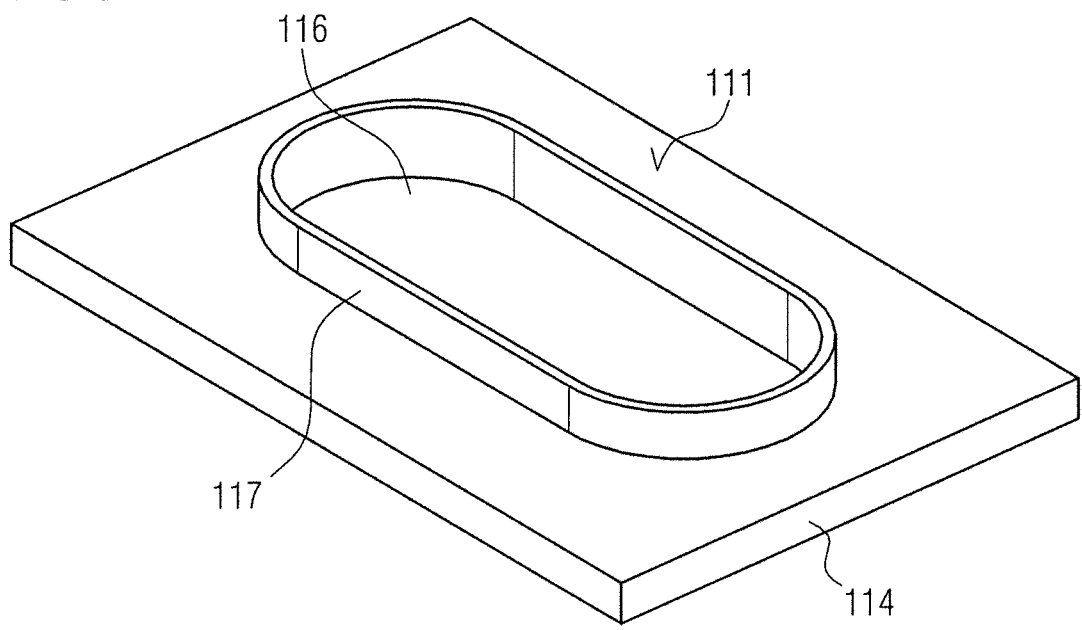
FIGS. 3 and 4 show perspective representations of a carrier constituted by singulating from the initial carrier.

At the first side 111 shown in FIG. 1, the initial carrier 110 comprises a multiplicity of protruding and circumferential collar sections 117. Each cutout 116 is enclosed by such a collar section 117. For better illustration of this structure, FIG. 3 shows a perspective representation of a frame-shaped carrier 114 with a view of the first side 111. Such frame-shaped carriers 114 are produced at the end of the production method by singulating from the initial carrier 110 (cf. FIG. 8). Because of the frame shape, the carriers 114 may also be referred to as a frame, or frame part, and the initial carrier 110 on which they are based may also be referred to as a frame assembly. With the aid of FIGS. 1 and 3 it is apparent that the collar sections 117 comprise a contour, in this example a rounded rectangular contour, corresponding to the cutouts 116. Furthermore, the initial carrier 110 and its collar sections 117 comprise thickness or depth dimensions such that a large part of the cutouts 116 is respectively constituted with the aid of the circumferential collar sections 117 (cf. FIG. 5).

Figure 4:
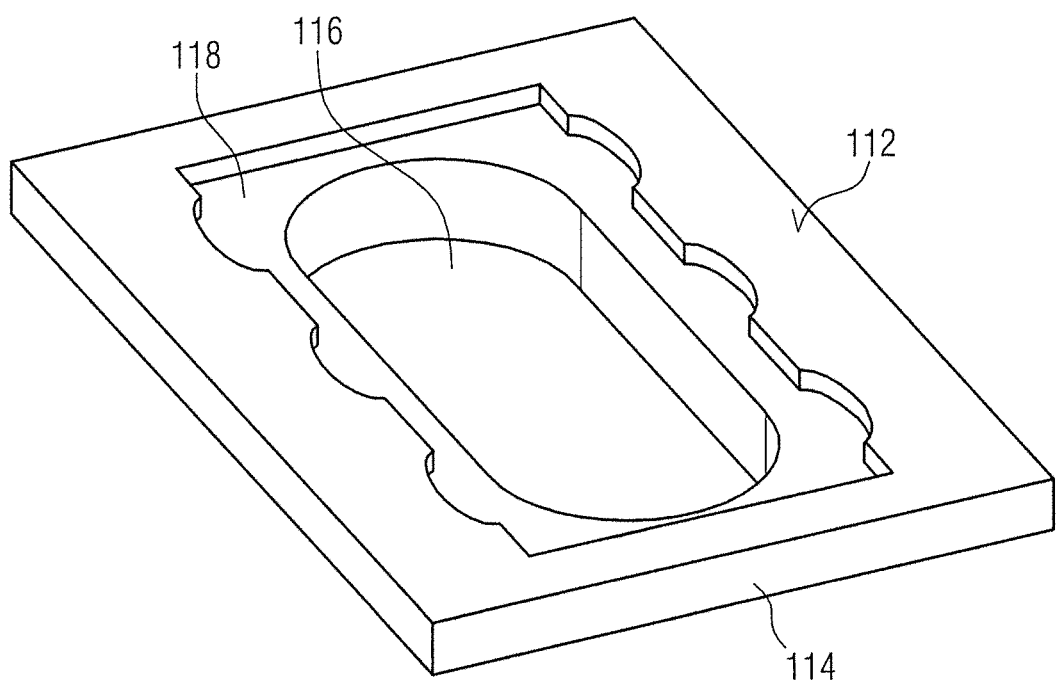

At the second side 112 shown in FIG. 2, the initial carrier 110 comprises a multiplicity of indentations 118. One of the cutouts 116 is respectively formed inside the indentations 118 such that inside each indentation 118 a respective one of the cutouts 116 is formed such that each indentation 118 merges with the associated one of the cutouts 116. In respect of this structure, FIG. 4 shows for better illustration a further perspective representation of a carrier 114 constituted by singulating from the initial carrier 110. With the aid of FIGS. 2 and 4, it is apparent that the indentations 118 comprise a contour enclosing the cutouts 116 and is essentially rectangular. The shorter edge sides of the indentations 118 are formed to be straight. The longer edge sides of the indentations 118 comprise bulges. The indentations 118 may alternatively comprise a different contour, for example, a purely rectangular contour or a rounded rectangular contour corresponding to the cutouts 116.

The initial carrier 110 is formed from an opaque material. This may, for example, be an opaque plastic material. In this way, provision of the initial carrier 110 may, for example, be carried out with an injection-molding process (injection molding). For example, LCP (liquid-crystal polymer), PPA (polyphthalamide) or PC (polycarbonate) may be used as a plastic material for the initial carrier 110. As an alternative, the initial carrier 110 may be made from a different opaque material, for example, a metallic material or an opaque ceramic material.

Figure 5:
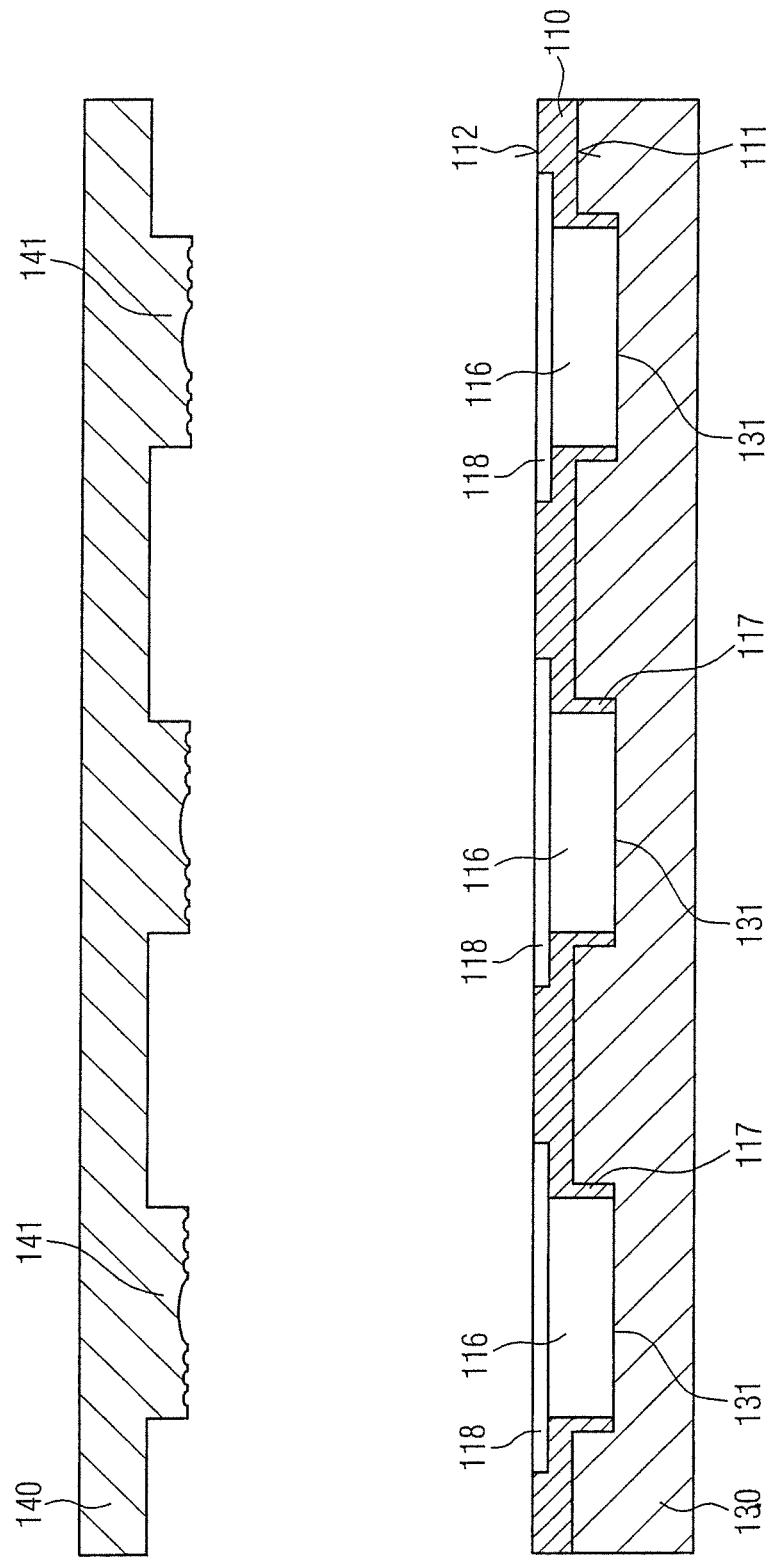

During the method, a molding process (mold process) is furthermore carried out by which transparent optical molded parts 124 arranged in the cutouts 116 of the initial carrier 110 are formed. Since curing with UV radiation is carried out during this process, as will be further described below, the molding process may be referred to as a UV molding process or UV mold process. During the molding process, a tool (mold tool) is used that comprises two tool parts 130, 140, as shown in FIG. 5 in a lateral sectional representation. The tool parts 130, 140 are also referred to as first tool part 130 and second tool part 140 to distinguish them below.

As represented in FIG. 5, the initial carrier 110 is arranged with its first side 111 on the first tool part 130. The tool part 130 comprises recesses 131 in which the collar sections 117 of the initial carrier 110 can be received. In this way, the initial carrier 110 can be oriented, and the position of the initial carrier 110 on the tool part 130 can be established reliably. In the configuration shown in FIG. 5, the recesses 131 of the tool part 130 comprise a planar bottom.

It is furthermore shown in FIG. 5 that the second tool part 140 comprises protruding molding sections 141 at a side facing toward the first tool part 130 and, therefore, the initial carrier 110. The molding sections 141 comprise at one extreme end a surface shape or surface structure, suitable for producing a beam-shaping optical surface, this shape or structure being matched to the optical molded parts 124 to be produced. In this example, the molded parts 124 are formed with a Fresnel lens structure 126 (cf. FIG. 8). Correspondingly, the structure present on each of the molding sections 141 at the end is a negative form of a Fresnel lens structure 126.

The molding sections 141 of the second tool part 140 comprise a rounded rectangular contour (not represented) corresponding to the cutouts 116 of the initial carrier 110 so that the molding sections 141 can be inserted into the cutouts 116 of the initial carrier 110. In this example, the lateral dimensions of the molding sections 141 are somewhat smaller than the lateral dimensions of the cutouts 116 to allow a suitable freedom of movement of the molding sections 141 inside the cutouts 116 in respect of a molding process subsequently carried out, and to provide access to the indentations 118.

Figure 6:
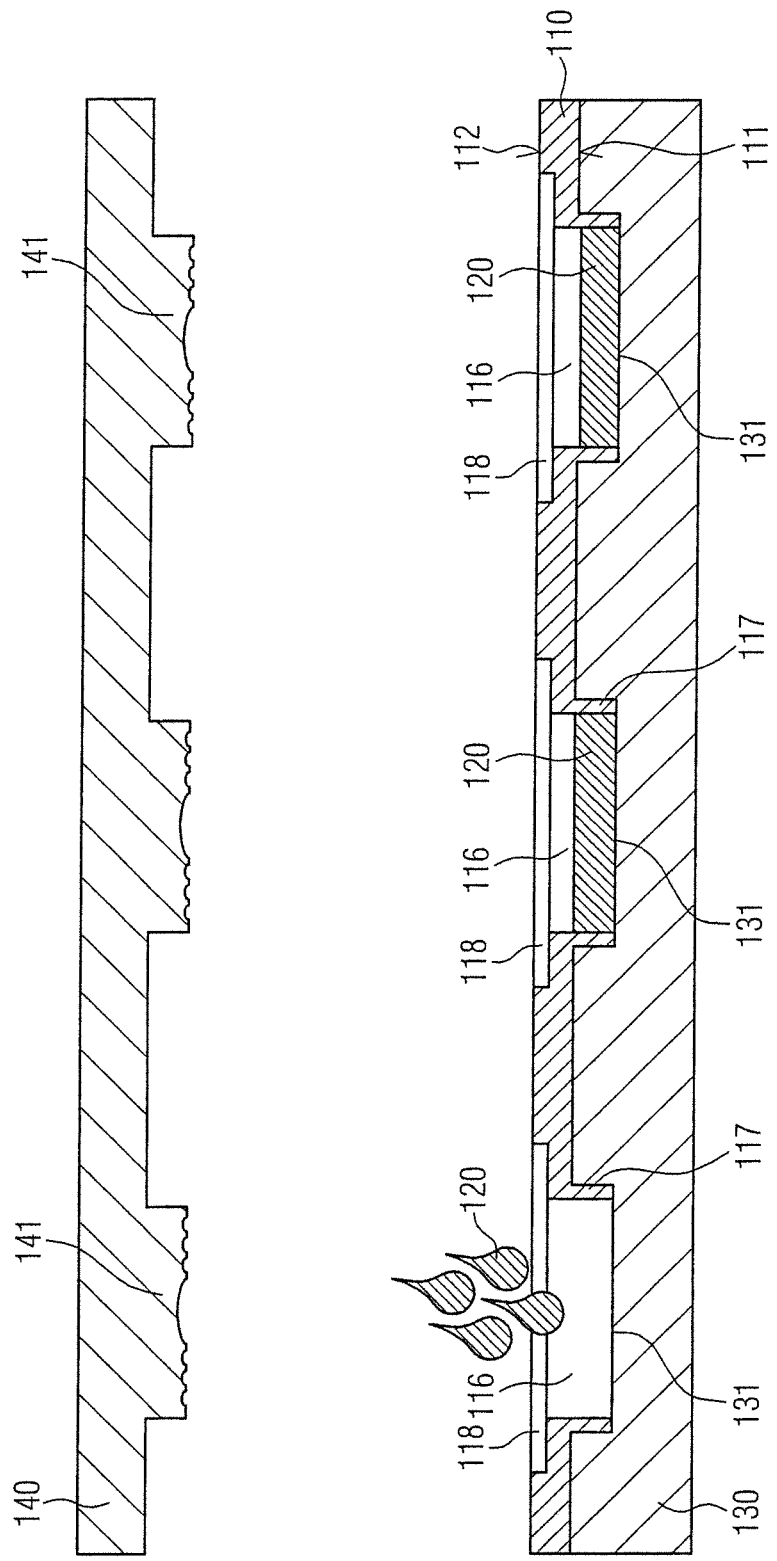

After the initial carrier 110 has been arranged on the first tool part 130 as shown in FIG. 6, a transparent molding compound 120 is applied onto the tool part 130 in the region of the recesses 131, and is thereby introduced into each cutout 116 of the initial carrier 110 in the region of the collar sections 117. The application is carried out in a liquid or viscous state of the molding compound 120. To this end, for example, a dosing process may be carried out with the aid of a dispenser (dispensing). Dropwise application by using a printing device (jetting) is also possible (respectively not represented). As indicated in FIG. 6, the cutouts 116 of the initial carrier 110 may be provided successively with the molding compound 120. It is also possible respectively to provide a plurality or all of the cutouts 116 of the initial carrier 110 with the molding compound 120 together.

The transparent molding compound 120 used is a UV-curing molding compound 120 that can be solidified by irradiation with UV radiation. The molding compound 120 may be a transparent UV-curing plastic material or resin material. It is, for example, possible to use a transparent UV-curing silicone material or a transparent UV-curing epoxide material.

After the molding compound 120 has been introduced into the cutouts 116 of the initial carrier 110, the tool parts 130, 140 are brought together such that the molding sections 141 of the second tool part 140 as shown in FIG. 7 are partly inserted into the cutouts 116 of the initial carrier 110. In this way, the molding sections 141 are pressed onto the liquid or viscous molding compound 120. In this way, the molding compound 120 is molded such that the molding compound 120 in the region of the respective cutouts 116 of the initial carrier 110 assumes a shape corresponding to the molded parts 124 to be produced, comprising a Fresnel lens structure 126 comprising a plurality of Fresnel steps. To bring the tool parts 130, 140 together to mold the molding compound 120, at least one of the tool parts, for example, the second tool part 140, may be moved.

During the molding process, the indentations 118 of the initial carrier 100 are used as reception or overflow cavities to receive air and excess portions of the molding compound 120. This is made possible by the configuration of the molding sections 141 comprising smaller lateral dimensions compared to the cutouts 116 of the initial carrier 110, and the access thereby constituted to the respective indentations 118. During the molding process, the molding compound 120 may consequently be displaced by the molding sections 141 and partially pressed into the indentations 118. In FIG. 7, this situation is indicated schematically respectively on the right-hand side of the molding sections 141. The configuration of the initial carrier 110 comprising the indentations 118 therefore offers the possibility of compensating for possibly appearing dosing inaccuracies when applying and introducing the molding compound 120 into the cutouts 116 of the initial carrier 110.

To make the optical molded parts 124, curing of the molding compound 120 is furthermore carried out to fix the shape previously adjusted with the aid of the tool parts 130, 140 and the cutouts 116 of the initial carrier 110. As indicated in FIG. 7 with the aid of arrows, this is carried out by exposure of the UV-curing molding compound 120 to UV radiation 160. With a view to the curing process, the two tool parts 130, 140 are transmissive for the UV radiation 160 used. In this way, as shown in FIG. 7, the molding compound 120 can be reliably exposed to the UV radiation 160 on two sides through the two tool parts 130, 140. To this end, the tool parts 130, 140 may be formed from a UV-transparent plastic material, for example, PDMS (polydimethylsiloxane).

The transparent optical molded parts 124 constituted by curing the molding compound 120 are located inside the cutouts 116 of the initial carrier 110 in the region of the collar sections 117 such that each molded part 124 directly adjoins a respective one of the collar sections 117. The molded parts 124 provided respectively comprise a Fresnel lens structure 126 at one side. An opposite side of the molded parts 124 to the latter is formed to be flat, corresponding to the planar bottom faces of the recesses 131 of the first tool part 130.

The above-described displacement of excess portions of the molding compound 120 in the direction of the indentations 118 of the initial carrier 110 furthermore leads as shown in FIG. 7 to the molded parts 124 being able to comprise sections 127 that extend to the indentations 118 and are present in the region of the indentations 118. By this configuration, anchoring and thereby improved mechanical fastening of the optical molded parts 124 on the initial carrier 120, and therefore also on the carriers 114 produced therefrom, can be achieved. Anchoring the molded parts 124 may be promoted by the configuration of the indentations 118 comprising the bulges at the longer edge sides (cf. FIGS. 2 and 4).

Following the curing process, the tool comprising the two tool parts 130, 140 is opened, and the initial carrier 110 provided with the transparent optical molded parts 124 is removed from the first tool part 130. After this mold release step, the initial carrier 120 is singulated so that, as shown in FIG. 8, separate optical components 100 are constituted. By the singulating process, the initial carrier 110 is separated along separating lines 170, for example, by sawing. Singulating the initial carrier 110 may be carried out such that the carriers 114, and therefore the optical components 100, comprise a rectangular plan view shape as illustrated in relation to one carrier 114 in FIGS. 3 and 4.

The optical components 100 produced with the aid of the method and shown in FIG. 8 respectively comprise a frame-shaped carrier 114 produced from the initial carrier 110 comprising a cutout 116, and a transparent optical molded part 124 arranged in the cutout 116 and comprising a Fresnel lens structure 126. The carrier 114 of such an optical component 100 comprises two opposite sides 111, 112 in which case the side 111 may constitute a front side, and the other side 112 may constitute a rear side usable for mounting of the carrier 114 and therefore the optical component 100. Like the initial carrier 110 on which it is based, the carrier 114 is formed from an opaque material. In this way, the carrier 114, or the collar section 117 of the carrier 114, by which the optical molded part 124 is enclosed, may constitute an opaque side wall extending around the molded part 124.

The optical components 100 produced may be used as primary optics of light-emitting components for beam-shaping (not represented). This may, for example, involve LED-based flash lights of mobile devices, for example, smartphones. A further possible application are LED components for background lighting of a liquid-crystal display. The effect of the frame-shaped carrier parts 114 and the opaque side walls, provided thereby, of the optical components 100 is that lateral radiation emission by the optical components 100 can be avoided during operation of the light-emitting components equipped with the optical components 100.

Other variants and modifications that may be envisioned for the production method will be described below. Method steps, features and advantages—corresponding to one another as well as component parts which are the same and have the same effect, will not be described in detail again below. For details in this regard, reference is instead made to the description above. Furthermore, aspects and details mentioned in relation to one configuration of the method may also be used in relation to another configuration, and features of two or more configurations may be combined with one another.

Figure 9:
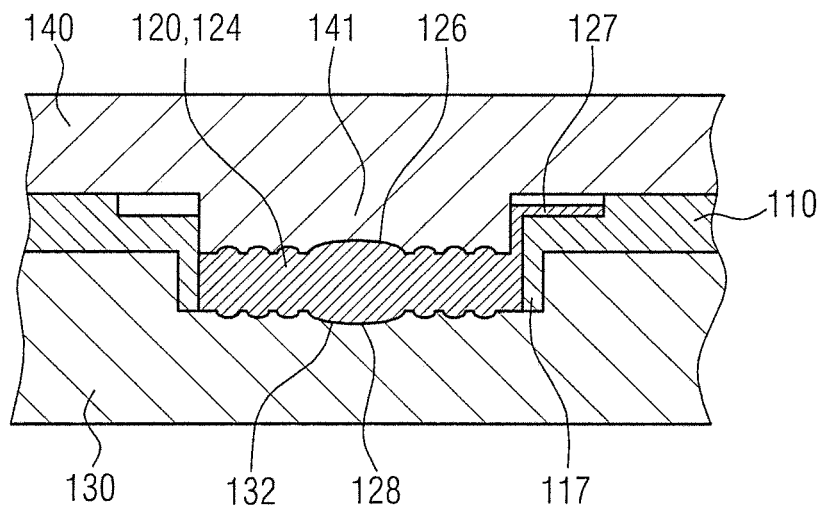
FIGS. 9 and 10 show formation of other molded parts comprising Fresnel lens structures.

Another example of the method includes forming a beam-shaping optical surface of the optical molded parts 124 of the optical components 100 with the aid of the first tool part 130. This is possible by configuring the tool part 130 comprising recesses 132 to receive the collar sections 117 of the initial carrier 110, the recesses 132 comprising at the bottom a surface shape matched to the molded parts 124. FIG. 9 illustrates such shaping as an excerpt in relation to a recess 132 of the tool part 130 and a molded part 124 to be produced.

According to the configuration shown in FIG. 9, the recesses 132 of the tool part 130 comprise a negative shape of a Fresnel lens structure 128. Correspondingly, by carrying out the molding process with the aid of the tool parts 130, 140, the second tool part 140 comprising the above-explained molding sections 141, it is possible to produce molded parts 124 comprising at both sides Fresnel lens structures 126, 128 comprising Fresnel steps. In contrast to the schematic representation in FIG. 9, the tool parts 130, 140 may also be formed such that the Fresnel lens structures 126, 128 differ from one another.

Figure 10:
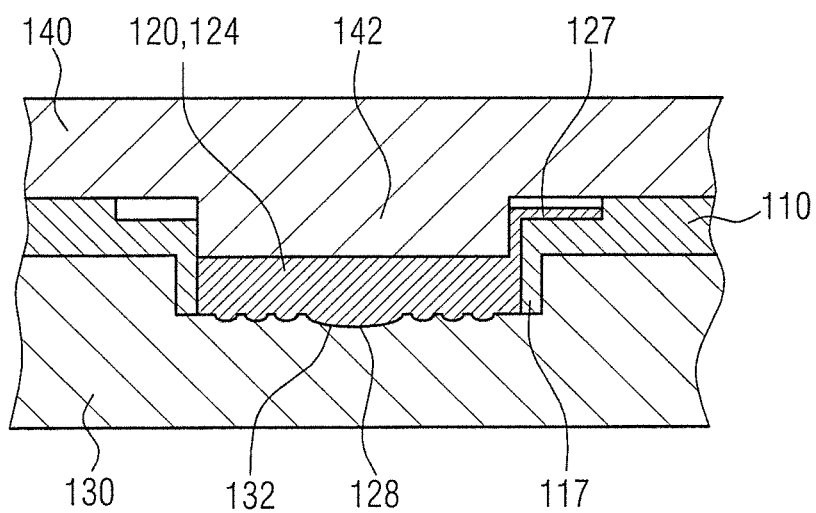

In another example of the method, a beam-shaping surface of the molded parts 124 is produced only with the aid of the first tool part 130, or only with the aid of its recesses 132. In this example, the second tool part 140 comprises protruding molding sections 142 formed to be flat at the end as shown in FIG. 10 as an excerpt in relation to a molded part 124 to be produced. In this way, it is possible to form optical molded parts 124 comprising one side comprising a Fresnel lens structure 128 and a flat opposite side. Compared to the molded parts 124 shown in FIGS. 7 and 8, these molded parts 124 comprise a side-inverted arrangement of the structured and flat sides.

Other variants and modifications of the method may be implemented by using different materials instead of the above-mentioned materials for an initial carrier 110, a molding compound 120 and/or tool parts 130, 140. Furthermore, the following method examples, which are not represented, may be used.

Another possible example includes forming transparent optical molded parts 124 not only with a Fresnel lens structure 126, 128, but also with a different optical structure or optical surface. For example, it is possible to produce molded parts 124 comprising a convexly or concavely curved lens surface. It is also possible to produce molded parts 124 comprising an optical surface comprising a regular arrangement of structural elements, for example, microlenses, micropyramids, microcones and the like.

The molded parts 124 may be made such that such or alternatively other optically active surfaces are present at one or at two opposite sides of the molded parts 124. This may be implemented with the aid of tool parts 130, 140 adapted thereto. In configuration at both sides, it is also possible to provide different optical surface structures for the opposite sides of the molded parts 124. One example is a configuration comprising a Fresnel lens structure at one side and a curved surface at the side opposite the latter.

In relation to sections 127 of molded parts 124 that may be produced from excess portions of a molding compound 120 and may extend to indentations 118 of an initial carrier 110 and therefore carriers 114 produced therefrom, the molded parts 124 may respectively comprise such a section 127 in a subregion as represented in FIGS. 7 to 10. A molded part 124 may also comprise a plurality of such sections 127, or a single section 127 extending around in the manner of a flange.

An initial carrier 110 used to produce optical components 100 may comprise further structures suitable for orientation on a tool part 130 in addition to collar sections 117. Such structures may, for example, be formed in the form of elevations at the edge of an initial carrier 110. A tool part 130 on which such an initial carrier 110 is arranged for a molding process may comprise recesses corresponding thereto to receive the orientation structures.

Another possible example includes using a plate-shaped initial carrier 110 without collar sections 117. A tool part 130 on which such an initial carrier 110 is arranged may, in contrast to FIGS. 5, 6, 7, 9, 10, be configured without recesses 131, 132 and, for example, comprise a planar surface in a region in which molded parts 124 are formed in cutouts 116 of the initial carrier 110. A configuration of the tool part 130 comprising a surface shape suitable for producing a beam-shaping optical surface in the region of the molded parts 124 respectively to be produced is also possible. The aforementioned configurations may be used to allow orientation of the initial carrier 110 (orientation structures at the edge of the initial carrier 110, tool part 130 comprising recesses for the orientation structures).

Furthermore, a plate-shaped initial carrier 110 without indentations 118 may also be used. This, for example, is possible when an as accurate as possible dosing can be ensured when introducing a molding compound 120 into cutouts 116 of the initial carrier 110.

In respect of curing of a molding compound 120 with the aid of irradiation with UV radiation, it may be possible that only one tool part of a tool used in the molding process is transmissive for the UV radiation.

Although our methods have been illustrated and described in detail by preferred examples, this disclosure is not restricted to the examples disclosed, and other variants may be derived therefrom by those skilled in the art without departing from the protective scope of the appended claims.

This application claims priority of DE 10 2016 113 471.6, the subject matter of which is incorporated herein by reference.

The invention claimed is:

1. A method of producing optical components comprising:
   providing an initial carrier comprising cutouts, a first side, a second side opposite the first side and protruding collar sections at the first side of the initial carrier and indentations, wherein the collar sections protrude from and extend away from the first side of the initial carrier, each collar section encloses a respective one of the cutouts, and inside each indentation a respective one of the cutouts is formed;
   carrying out a molding process to form transparent optical molded parts arranged in the cutouts of the initial carrier, wherein a molding compound is introduced into the cutouts of the initial carrier and the molding compound is molded and cured;
   singulating the initial carrier comprising the optical molded parts so that separate optical components are formed that respectively comprise a carrier produced from the initial carrier and comprising a cutout, and an optical molded part arranged in the cutout, and
   the optical molded parts are formed in a region of the collar sections so that each optical molded part is laterally enclosed by and directly adjoins a respective one of the collar sections.

2. The method according to claim 1, wherein the initial carrier is arranged on a tool part to carry out the molding process, a further tool part comprising protruding molding sections is used, and the molding sections are inserted into the cutouts of the initial carrier to mold the molding compound by bringing together the tool part and the further tool part.

3. The method according to claim 2, wherein the molding sections comprise a surface shape to produce a beam-shaping surface.

4. The method according to claim 1, wherein the indentations constitute overflow regions that receive excess portions of the molding compound during the molding process so that the optical molded parts comprise anchoring sections produced from excess portions of the molding compound, extend to the indentations and are present in the indentations.

5. The method according to claim 1, wherein the initial carrier is arranged on a tool part to carry out the molding process, and the tool part comprises recesses to receive the collar sections.

6. The method according to claim 5, wherein the recesses comprise a surface shape to produce a beam-shaping surface.

7. The method according to claim 1, wherein the molding compound is a UV-curing molding compound, and irradiation with UV radiation is carried out to cure the molding compound.

8. The method according to claim 1, wherein the molding process is carried out with the aid of tool parts, and at least one tool part is transmissive for UV radiation.

9. The method according to claim 1, wherein the optical molded parts formed by the molding process are one of:
   lenses; or
   lenses comprising a Fresnel lens structure.

10. The method according to claim 1, wherein the initial carrier is formed from an opaque material.

11. The method according to claim 1, wherein the indentations are formed at the second side of the initial carrier.

12. The method according to claim 1, wherein the initial carrier is separated along separating lines during the singulating.

13. A method of producing optical components comprising:
   providing an initial carrier comprising cutouts, a first side, a second side opposite the first side and protruding collar sections at the first side of the initial carrier and indentations at the second side of the initial carrier, wherein the collar sections protrude from and extend away from the first side of the initial carrier, each collar section encloses a respective one of the cutouts, and inside each indentation a respective one of the cutouts is formed such that each indentation merges with the associated one of the cutouts;
   carrying out a molding process to form transparent optical molded parts arranged in the cutouts of the initial carrier, wherein a molding compound is introduced into the cutouts of the initial carrier and the molding compound is molded and cured; and
   singulating the initial carrier comprising the optical molded parts so that separate optical components are formed that respectively comprise a carrier produced from the initial carrier and comprising a cutout, and an optical molded part arranged in the cutout.

14. A method of producing optical components comprising:
   providing an initial carrier comprising cutouts, a first side, a second side opposite the first side and protruding collar sections at the first side of the initial carrier and indentations, wherein the collar sections protrude from and extend away from the first side of the initial carrier, each collar section encloses a respective one of the cutouts, and inside each indentation a respective one of the cutouts is formed;
   carrying out a molding process to form transparent optical molded parts arranged in the cutouts of the initial carrier, wherein a molding compound is introduced into the cutouts of the initial carrier and the molding compound is molded and cured;
   singulating the initial carrier comprising the optical molded parts so that separate optical components are formed that respectively comprise a carrier produced from the initial carrier and comprising a cutout, and an optical molded part arranged in the cutout,
   the optical molded parts are formed in a region of the collar sections so that each optical molded part is laterally enclosed by and directly adjoins a respective one of the collar sections, and the method further comprising at least one of:
   1) the indentations are formed at the second side of the initial carrier; and
   2) the indentations constitute overflow regions that receive excess portions of the molding compound during the molding process so that the optical molded parts comprise anchoring sections produced from excess portions of the molding compound, extend to the indentations and are present in the indentations.

\* \* \* \* \*